United States Patent
Hatano et al.

(10) Patent No.: US 9,079,350 B2
(45) Date of Patent: Jul. 14, 2015

(54) WAVE PLATE, METHOD FOR PRODUCING SAME, AND LIQUID CRYSTAL DISPLAY DEVICE

(75) Inventors: Taku Hatano, Tokyo (JP); Kenichi Harai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 673 days.

(21) Appl. No.: 13/389,967

(22) PCT Filed: Jul. 28, 2010

(86) PCT No.: PCT/JP2010/062706
§ 371 (c)(1),
(2), (4) Date: Feb. 10, 2012

(87) PCT Pub. No.: WO2011/018945
PCT Pub. Date: Feb. 17, 2011

(65) Prior Publication Data
US 2012/0140154 A1 Jun. 7, 2012

(30) Foreign Application Priority Data
Aug. 13, 2009 (JP) ................... 2009-187756

(51) Int. Cl.
*G02F 1/1335* (2006.01)
*B29C 55/02* (2006.01)
(Continued)

(52) U.S. Cl.
CPC ............. *B29C 55/023* (2013.01); *B29C 55/143* (2013.01); *G02B 5/3083* (2013.01); *B29K 2995/0034* (2013.01); *G02F 1/13363* (2013.01)

(58) Field of Classification Search
CPC .................................................. G02F 1/13363
USPC ........................................................ 349/117
See application file for complete search history.

(56) References Cited

U.S. PATENT DOCUMENTS

| 5,245,456 A | 9/1993 | Yoshimi et al. |
| 5,249,071 A | 9/1993 | Yoshimizu et al. |

(Continued)

FOREIGN PATENT DOCUMENTS

| CN | 101133349 A | 2/2008 |
| CN | 101153935 A | 4/2008 |

(Continued)

OTHER PUBLICATIONS

Chinese Office Action, dated Dec. 31, 2013, for Chinese Application No. 201080045154.2.
(Continued)

*Primary Examiner* — Edward Glick
*Assistant Examiner* — Alexander Gross
(74) *Attorney, Agent, or Firm* — Birch, Stewart, Kolasch & Birch, LLP

(57) ABSTRACT

A phase difference plate is manufactured by a method including a step of forming a multilayer body by co-extruding or co-casting a resin A having a positive intrinsic birefringence value and a resin B having a negative intrinsic birefringence value, the multilayer body including a layer "a" containing the resin A and a layer "b" containing the resin B; a step of stretching the multilayer body at a temperature T1 in one direction; and a step of subsequently stretching the multilayer body at temperature T2 lower than the temperature T1 in a direction that is approximately orthogonal to the previous stretching direction. The resulting phase difference plate has specific in-plane retardation Rea of the layer "a", retardation Rta in the thickness direction thereof, in-plane retardation Reb of the layer "b", and retardation Rtb in the thickness direction thereof.

6 Claims, 7 Drawing Sheets

(51) Int. Cl.
    *B29C 55/14*    (2006.01)
    *G02B 5/30*    (2006.01)
    *G02F 1/13363*    (2006.01)

(56) References Cited

U.S. PATENT DOCUMENTS

| | | | |
|---|---|---|---|
| 7,538,844 B2 * | 5/2009 | Lu et al. | 349/141 |
| 7,692,747 B2 | 4/2010 | Itadani et al. | |
| 7,876,403 B2 | 1/2011 | Fukuda et al. | |
| 7,906,184 B2 | 3/2011 | Umemoto et al. | |
| 7,939,002 B2 | 5/2011 | Inagaki et al. | |
| 8,435,598 B2 | 5/2013 | Itou | |
| 2002/0060762 A1 * | 5/2002 | Arakawa | 349/117 |
| 2002/0135728 A1 | 9/2002 | Tatsuta et al. | |
| 2007/0030417 A1 | 2/2007 | Kubo et al. | |
| 2007/0091228 A1 | 4/2007 | Itadani et al. | |
| 2009/0169844 A1 * | 7/2009 | Yamamura et al. | 428/213 |
| 2009/0316094 A1 | 12/2009 | La et al. | |
| 2010/0276826 A1 | 11/2010 | Takahata et al. | |

FOREIGN PATENT DOCUMENTS

| | | |
|---|---|---|
| CN | 101322055 A | 12/2008 |
| CN | 101365970 A | 2/2009 |
| JP | 4-194820 A | 7/1992 |
| JP | 5-157911 A | 6/1993 |
| JP | 2005-156863 A | 6/2005 |
| JP | 2005-173584 A | 6/2005 |
| JP | 2006-84700 A | 3/2006 |
| JP | 2009-47950 A | 3/2009 |
| WO | WO 2005/050300 A1 | 6/2005 |
| WO | WO 2006/117981 A1 | 11/2006 |
| WO | WO 2006/118234 A1 | 11/2006 |
| WO | WO 2007/064029 A1 | 6/2007 |
| WO | WO 2009/038100 A1 | 3/2009 |

OTHER PUBLICATIONS

PCT/ISA/210—International Search Report dated Sep. 7, 2010, issued in PCT/JP2010/062706.
PCT/ISA/237—Writen Opinion of the International Searching Authority dated Sep. 7, 2010, issued in PCT/JP2010/062706.

* cited by examiner

Example 1

Example 1

Example 2

Example 2

Example 3

Azimuth angle (deg)

Example 3

Comparative Example 1

Comparative Example 1

Example 4

Example 4

Example 5

Example 5

WAVE PLATE, METHOD FOR PRODUCING SAME, AND LIQUID CRYSTAL DISPLAY DEVICE

TECHNICAL FIELD

The present invention relates to a phase difference plate, a method for manufacturing the same, and a liquid crystal display device. In particular, the invention relates to a phase difference plate that is suitable for optical compensation of a liquid crystal display device, a method for manufacturing the phase difference plate, and a liquid crystal display device that incorporates the phase difference plate.

BACKGROUND ART

Liquid crystal display devices are generally configured to include a liquid crystal cell and a pair of polarizing plates (a polarizing plate of light incident side and a polarizing plate of light emitting side) which are disposed to sandwich the liquid crystal cell. In usual liquid crystal display modes such as VA mode and IPS mode, the pair of polarizing plates are usually disposed in crossed Nicol arrangement. That is, the polarizing plates are disposed so that the absorption axes of the polarizing plates are oriented in approximately orthogonal to each other, whereby black color is displayed (light passage is blocked) in the absence of an electric field.

However, when such a liquid crystal display device is observed from a tilted direction, the absorption axes of the pair of polarizing plates may apparently form an angle that is greater than the right angle (an obtuse angle), which results in light leakage. That is, when the liquid crystal display device is observed from a tilted direction, the display of black color appears imperfect as compared with the display of black color when observed from the front direction. Thus, the contrast appearing on the liquid crystal display device when observed from a tilted direction may be lower than the contrast appearing on the liquid crystal display device when observed from the front direction.

In order to reduce such light leakage, a liquid crystal display device usually has, between the pair of polarizing plates, a phase difference plate for compensating for light leakage caused by these polarizing plates (this may be referred to hereinafter as the "polarizing plate compensation"). As means for realizing the polarizing plate compensation function, it has been suggested that a phase difference plate should be interposed between the pair of polarizing plates, wherein the phase difference plate has an in-plane refractive index $n_x$ along the retarded phase axis, an in-plane refractive index $n_y$ in an orthogonal direction thereto, and a refractive index $n_z$ in the thickness direction that meet the relationship of $n_x > n_z > n_y$. For example, Patent Document 1 discloses a phase difference plate which meets the relationship of $0 < (n_x - n_z)/(n_x - n_y) < 1$, wherein the phase difference plate is obtained in a manner such that, when a resin film is stretched, a contractive film is attached to either one side or both sides of the resin film to form a multilayer body, and then the multilayer body is stretched under application of heat, to apply contractive force to the resin film in a direction orthogonal to the stretching direction thereof.

LIST OF PRIOR ART DOCUMENTS

Patent Documents

Patent Document 1: Japanese Patent Application Laid-Open No. Hei 5-157911 (corresponding U.S. Pat. No. 5,245,456)

SUMMARY OF THE INVENTION

Problem to be Solved by the Invention

However, the technique disclosed in Patent Document 1 has a problem that the method for manufacturing the phase difference plate is complicated because a specific film has to be prepared and then subjected to special processing. Furthermore, the technique disclosed in Patent Document 1 has another problem that it is difficult to manufacture phase difference plates having a great width because the plates are obtained by shrinkage of the multilayer body.

The present invention has been made in view of the aforementioned problems. It is therefore an object of the present invention to provide a phase difference plate which can have a great width and can be manufactured in a simplified manner, a method for manufacturing the phase difference plate, and a liquid crystal display device which incorporates the phase difference plate.

Means for Solving the Problem

In order to address the aforementioned problems and achieve the object, the present inventors have conducted intensive studies. As a result, the present inventors have found out that a phase difference plate having a retardation (also referred to as a phase difference) suitable for exerting the polarizing plate compensation function can be manufactured by a simplified method in which a multilayer body obtained by co-extruding or co-casting a resin A having a positive intrinsic birefringence value and a resin B having a negative intrinsic birefringence value is stretched at different temperatures in different directions approximately orthogonal to each other. The present invention has been completed based on this finding.

That is, the gist of the present invention is as in the following (1) to (5).

(1) A method for manufacturing a phase difference plate, comprising:

a step of co-extruding or co-casting a resin A having a positive intrinsic birefringence value and a resin B having a negative intrinsic birefringence value, to form a multilayer body including a layer "a" containing the resin A and a layer "b" containing the resin B;

a first stretching step of stretching the multilayer body at a temperature T1 in one direction; and a second stretching step of stretching, after the first stretching step, the multilayer body at a temperature T2 that is lower than the temperature T1 in another direction that is approximately orthogonal to the aforementioned stretching direction to obtain the phase difference plate, wherein:

the phase difference plate satisfies Equation 1 to Equation 4:

$$0 \text{ nm} < Rea < 50 \text{ nm} \qquad \text{Equation 1}$$

$$50 \text{ nm} < Rta < 100 \text{ nm} \qquad \text{Equation 2}$$

$$100 \text{ nm} < Reb < 150 \text{ nm} \qquad \text{Equation 3}$$

$$-100 \text{ nm} < Rtb < -40 \text{ nm} \qquad \text{Equation 4}$$

wherein Rea is an in-plane retardation of the stretched layer "a", Rta is a retardation in a thickness direction of the stretched layer "a", Reb is an in-plane retardation of the stretched layer "b", and Rtb is a retardation in a thickness direction of the stretched layer "b".

(2) The method for manufacturing a phase difference plate according to (1), wherein a glass transition temperature $Tg_A$ of the resin A and a glass transition temperature $Tg_B$ of the resin B satisfy a relationship of $Tg_A > Tg_B + 5°$ C.
(3) A phase difference plate which is obtained by the manufacturing method according to (1) or (2).
(4) A liquid crystal display device comprising a pair of polarizing plates disposed so that respective absorption axes of the plates are approximately orthogonal to each other, and a liquid crystal cell interposed between the pair of polarizing plates, wherein the device further comprising the phase difference plate according to (3) interposed between any one of the pair of polarizing plates and the liquid crystal cell.
(5) The liquid crystal display device according to (4), wherein the liquid crystal cell employs an in-plane switching display mode.

Effect of the Invention

The phase difference plate of the present invention and the manufacturing method thereof enables production in a simplified manner of a phase difference plate having a relatively great width and having an ability to compensate light leakage caused by a pair of polarizing plates. Furthermore, the liquid crystal display device of the present invention can cut costs because the display device is provided with the phase difference plate of the present invention which can be manufactured in a simplified manner.

EMBODIMENTS OF THE INVENTION

Figure 1:
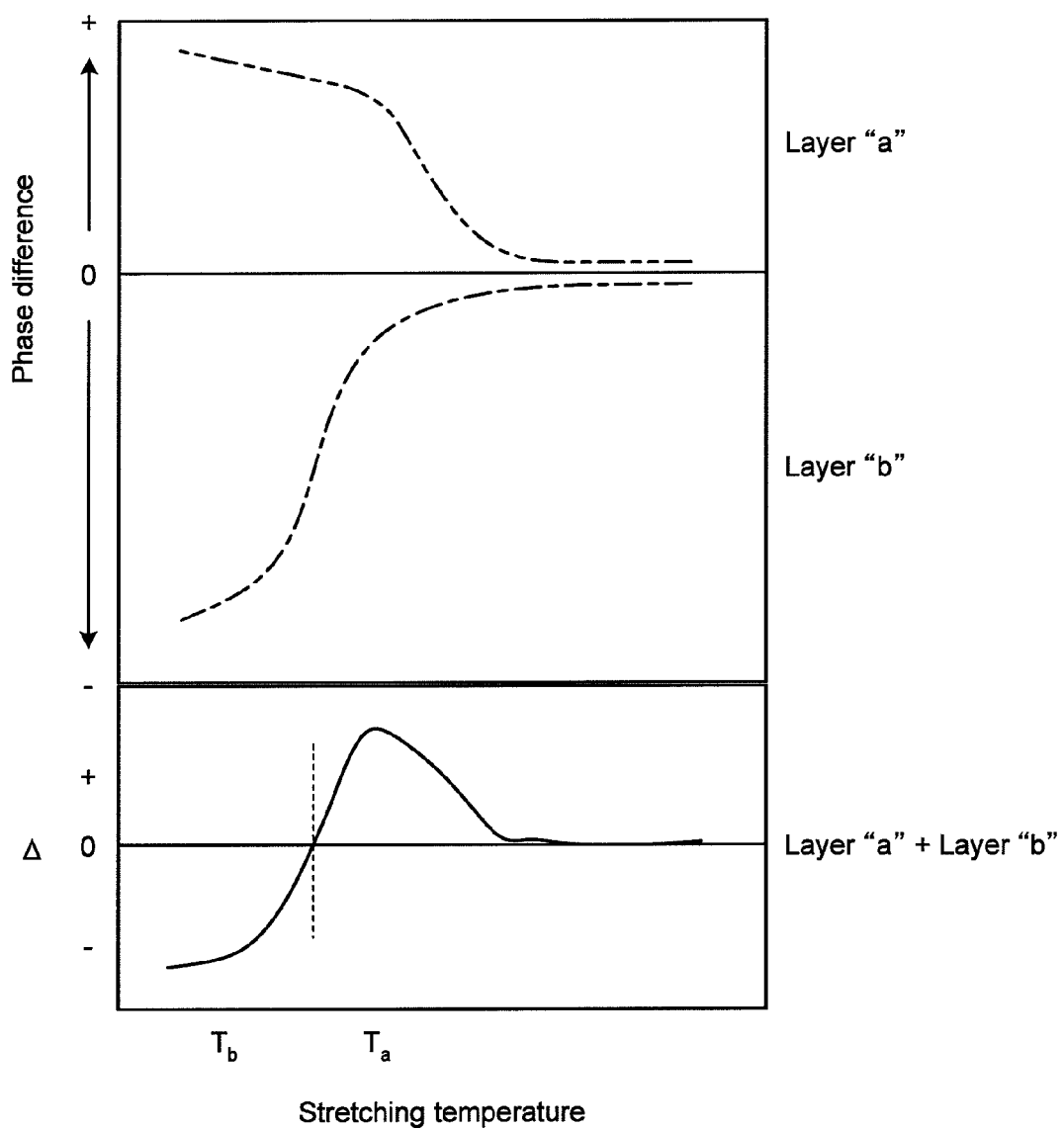
FIG. 1 is a graph illustrating an example of the temperature dependency of the phase difference Δ between a layer "a" and a layer "b" of a multilayer body for manufacturing phase difference plates when the layers are each stretched and the temperature dependency of the phase difference Δ when the multilayer body for manufacturing phase difference plates (in this case, the layer "a"+the layer "b") is stretched, assuming that the resin A forming the layer "a" has a higher glass transition temperature $Tg_A$ and the resin B forming the layer "b" has a lower glass transition temperature $Tg_B$.

The present invention will be described in more detail below by way of examples and embodiments, although the present invention is not limited to these examples and embodiments to be listed below and various modifications and changes can be made in the practice of this invention without departing from the range of the gist and equivalents thereof. Furthermore, as used herein, symbol "A" in resin A, symbol "B" in resin B, symbol "a" in layer "a", and symbol "b" in layer "b" are intended merely to distinguish the elements denoted with those symbols from other elements, with no other meanings attached thereto.

[1. Method for Manufacturing a Phase Difference Plate of the Present Invention]

The phase difference plate of the present invention is manufactured by a manufacturing method which includes the following steps: a step of co-extruding or co-casting a resin A having a positive intrinsic birefringence value and a resin B having a negative intrinsic birefringence value, to form a multilayer body including a layer "a" containing the resin A and a layer "b" containing the resin B (this structure may be referred to hereinbelow as "the multilayer body for manufacturing phase difference plates") (the step of forming the multilayer body); a first stretching step of stretching the multilayer body for manufacturing phase difference plates at a temperature T1 in one direction; and a second stretching step of stretching, after the first stretching step, the multilayer body at a temperature T2 that is lower than the temperature T1 in another direction that is approximately orthogonal to the aforementioned stretching direction.

[1-1. Step of Forming the Multilayer Body]

In the step of forming the multilayer body, the multilayer body for manufacturing phase difference plates is formed by co-extruding or co-casting the resin A having a positive intrinsic birefringence value and the resin B having a negative intrinsic birefringence value. The co-extrusion method is preferable from the viewpoints that will be described later. As used herein, the expression "a positive intrinsic birefringence value" means that the refractive index in the stretched direction is greater than the refractive index in a direction orthogonal thereto, whereas the expression "a negative intrinsic birefringence value" means that the refractive index in the stretched direction is less than the refractive index in a direction orthogonal thereto. The intrinsic birefringence value may also be calculated from an electric permittivity distribution.

(i. Resin A)

It is preferable that the resin A is a thermoplastic resin. Examples of polymers contained in the resin A may include olefin polymers such as polyethylene and polypropylene; polyester polymers such as polyethylene terephthalate and polybutylene terephthalate; polyarylene sulfide polymers such as polyphenylene sulfide; polyvinyl alcohol polymers; polycarbonate polymers; polyarylate polymers; cellulose ester polymers; polyethersulphone polymers; polysulfone polymers; polyarylsulfone polymers; polyvinyl chloride polymers; norbornene polymers; and rod-like liquid crystal polymers. One species of these polymers may be solely used or two or more species thereof may be used in combination at any given ratio. Furthermore, the polymer may be a homopolymer or a copolymer. Among these polymers, the polycarbonate polymer is preferable from the viewpoints of expressing the phase difference, stretching property at low temperatures, and adhesion of the layer "a" to layers other than the layer "a".

The resin A may contain a compounding agent. Examples of compounding agents may include a lubricant; a layered crystalline compound; an inorganic fine particle; stabilizers such as an antioxidant, a heat stabilizer, a light stabilizer, a weather-resistant stabilizer, a ultraviolet absorber, and a near-IR absorber; a plasticizer; coloring agents such as a dye and a pigment; and an anti-static agent. Among these compounding agents, the lubricant and the ultraviolet absorber are preferable as these can improve flexibility and weather-resistance. The amount of a compounding agent may be suitably determined within the range that may not hinder the effects of the present invention. For example, the amount may fall within the range that can maintain a total optical transmittance of 80% or more of the multilayer body for manufacturing phase difference plates when the multilayer body has a thickness of 1 mm.

Examples of lubricants may include inorganic particles such as silicon dioxide, titanium dioxide, magnesium oxide, calcium carbonate, magnesium carbonate, barium sulfate, and strontium sulfate; and organic particles such as polymethyl acrylate, polymethyl methacrylate, polyacrylonitrile, polystyrene, cellulose acetate, and cellulose acetate propionate. Among these lubricants, the organic particle is preferable as the lubricant.

Examples of ultraviolet absorbers may include oxybenzophenone-type compounds, benzotriazole-type compounds, salicylic ester type compounds, benzophenone-based ultraviolet absorbers, benzotriazole-based ultraviolet absorbers, acrylonitrile-based ultraviolet absorbers, triazine-based compounds, nickel complex salt based compounds, and inorganic powders. Specifically preferable examples of ultraviolet absorbers may include 2,2'-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2,4-di-tert-butyl-6-(5-chlorobenzotriazol-2-yl)phenol, 2,2'-dihydroxy-4,4'-dimethoxy benzophenone, and 2,2',4,4'-tetrahydroxy benzophenone. The particularly preferable one is 2,2'-methylenebis(4-(1,1,3,3-tetramethylbutyl)-6-(2H-benzotriazol-2-yl)phenol).

One species of these compounding agents may be solely used or two or more species thereof may be used in combination at any given ratio.

The weight-average molecular weight of the resin A may be preferably adjusted within the range in which the resin A can be processed by melt extrusion or by solution casting.

The glass transition temperature $Tg_A$ of the resin A is usually 80° C. or higher, preferably 90° C. or higher, more preferably 100° C. or higher, much more preferably 110° C. or higher, and particularly preferably 120° C. or higher. Having such high glass transition temperature $Tg_A$, it is possible to reduce the orientation relaxation of the resin A. Although there is no specific upper limit with the glass transition temperature $Tg_A$, the upper limit is usually 200° C. or lower.

The rupture elongation of the resin A at the glass transition temperature $Tg_B$ of the resin B which will be described later is preferably 50% or greater, and more preferably 80% or greater. With the rupture elongation falling in this range, it is possible to stably manufacture the phase difference plate of the present invention by stretching. The rupture elongation is determined using a test piece type 1B in accordance with JIS K7127 at a tensile speed of 100 mm/min.

(ii. Resin B)

It is preferable that the resin B is a thermoplastic resin. Examples of polymers contained in the resin B may include polystyrenes including a homopolymer of styrene or styrene derivative or a copolymer thereof with another monomer; polyacrylonitrile, polymethyl methacrylate, and multi-component copolymers thereof. Preferable examples of other monomers to be copolymerized with the styrene or the styrene derivative may include acrylonitrile, maleic anhydride, methyl methacrylate, and butadiene. One species of these polymers may be solely used or two or more species thereof may be used in combination at any given ratio. Among these polymers, from the viewpoint of high ability for expressing phase difference, polystyrenes are preferable. Further, the copolymer of styrene or styrene derivative and maleic anhydride is particularly preferable in terms of heat resistance.

The resin B may contain a compounding agent. Examples of compounding agents may include the same compounding agents as those that the resin A may contain. The amount of a compounding agent may be suitably determined within the range that may not hinder the effects of the present invention. For example, the amount may fall within the range that can maintain a total optical transmittance of 80% or more for a multilayer body for manufacturing phase difference plates when the multilayer body has a thickness of 1 mm. One species of the compounding agent may be solely used or two or more species thereof may be used in combination at any given ratio.

The weight-average molecular weight of the resin B may be preferably adjusted within the range in which the resin B can be processed by melt extrusion or by solution casting.

The glass transition temperature $Tg_B$ of the resin B is usually 80° C. or higher, preferably 90° C. or higher, more preferably 100° C. or higher, much more preferably 110° C. or higher, and particularly preferably 120° C. or higher. Having such high glass transition temperature $Tg_B$, it is possible to reduce the orientation relaxation of the resin B. Although there is no specific upper limit with the glass transition temperature $Tg_B$, the upper limit is usually 200° C. or lower.

The rupture elongation of the resin B at the glass transition temperature $Tg_A$ of the resin A is preferably 50% or greater, and more preferably 80% or greater. Although there is no specific upper limit with the rupture elongation of the resin B, the upper limit is usually 200% or less. With the resin having a rupture elongation that falls within this range, it is possible to stably manufacture the phase difference plate of the present invention by stretching.

The absolute value of the difference between the glass transition temperature $Tg_A$ of the resin A and the glass transition temperature $Tg_B$ of the resin B is preferably 5° C. or greater, and more preferably 8° C. or greater, and preferably 40° C. or smaller, more preferably 30° C. or smaller, and particularly preferably 20° C. or smaller. Excessively small absolute values of the difference between the glass transition temperatures tend to cause reduction in temperature dependency of phase difference expression. On the other hand, excessively great absolute values of the difference between the glass transition temperatures tend to cause difficulty in stretching of the resin having higher glass transition temperature and possibly tend to cause deterioration of the flatness of the phase difference plate. The glass transition temperature $Tg_A$ is preferably higher than the glass transition temperature $Tg_B$. Therefore, it is usually preferable that the resin A and the resin B satisfy the relationship of $Tg_A > Tg_B + 5°$ C.

(iii. Method for Forming the Multilayer Body)

The multilayer body for manufacturing phase difference plates in film-shape is formed by co-extruding or co-casting the aforementioned resin A having a positive intrinsic birefringence value and the resin B having a negative intrinsic birefringence value. The multilayer body for manufacturing phase difference plates may be obtained in this manner and the resulting multilayer body for manufacturing phase difference plates may be stretched to manufacture the phase difference plate, whereby the layer "a" and the layer "b" of the resulting phase difference plate are usually directly brought into contact with each other with no adhesive layer interposed therebetween. This enables reduction in the thickness of the phase difference plate, which is advantageous in realizing optical function.

In the present invention, it is preferable to employ the co-extrusion method. Examples of the co-extrusion method may include a co-extrusion T-die method, a co-extrusion inflation method, and a co-extrusion lamination method. The co-extrusion method is an excellent molding method in terms of production efficiency and from the viewpoint of obviating residual volatile components such as a solvent in the molded film. Among these methods, the co-extrusion T-die method is preferable. The co-extrusion T-die method may be performed with a feed block system or a multi-manifold system, and the multi-manifold system is particularly preferable since thereby unevenness in the thickness of the layer "a" can be reduced.

When the co-extrusion T-die method is employed, the melting temperature of resins in the extruder having T die may be set to a temperature higher than the glass transition temperature (Tg) of each resin with a difference of preferably 80° C. or greater, and more preferably of 100° C. or greater, and preferably of 180° C. or less, and more preferably of 150° C. or less. Excessively low melting temperatures of the resins in the extruder may cause insufficient flowability thereof, whereas excessively high melting temperatures may cause deterioration of the resins.

Usually, the sheet-shaped melted resin extruded through the opening in the die is brought into tight contact with a cooling drum. The method for effecting tight contact of the melted resin with the cooling drum is not limited to a particular one, and example thereof may include an air knife system, a vacuum box system, and an electrostatic intimate contact system.

The number of cooling drums is not limited to a particular number, and it is usually two or more. Furthermore, the cooling drums may be arranged, for example, in a straight line form, in a Z form, and in an L form although not limited thereto. Furthermore, the method for passing the melted resin that has been extruded through the opening of the die to the cooling drums is not limited to a particular method.

Depending on the temperature of the cooling drum, the level of contact tightness of the extruded sheet-shaped resin with the cooling drum may change. High temperature of the cooling drum may result in high contact tightness. However, excessively high temperature may hinder peeling of the sheet-shaped resin off the cooling drum, whereby the resin film may be wound around the drum and cause troubles. For this reason, when the glass transition temperature of the resin is Tg, the temperature of the cooling drum is preferably at a (Tg+30)° C. or lower, and more preferably falls within the range from (Tg−5)° C. to (Tg−45)° C., wherein the glass transition temperature Tg is of the resin which comes into contact with the drum, among the resins that are extruded through the die. This realizes prevention of troubles such as slipping or scratches.

It is preferable to reduce the residual solvent content in the multilayer body for manufacturing phase difference plates. Examples of the means therefor may include (1) reduction of the residual solvent in the raw material resin; and (2) preliminary drying of the resin before molding the multilayer body for manufacturing phase difference plates. Preliminary drying of the resin may be performed by, for example, drying with a hot-air dryer of the resin in a form of pellets. The drying temperature is preferably 100° C. or higher, and the drying time is preferably 2 hours or longer. By performing the preliminary drying, the residual solvent in the multilayer body for manufacturing phase difference plates can be reduced, and bubbles in the extruded sheet-shaped resin can also be reduced.

(iv. Multilayer Body for Manufacturing Phase Difference Plates)

The multilayer body for manufacturing phase difference plates includes the layer "a" containing the resin A having a positive intrinsic birefringence value and the layer "b" containing the resin B having a negative intrinsic birefringence value. When the multilayer body is stretched at the different temperatures, i.e., temperatures T1 and T2 at different angles that are approximately orthogonal to each other, each of the layer "a" and the layer "b" will have a phase difference depending on the respective temperatures T1 and T2 and the directions of stretching. With the combination of the phase differences that have occurred in this manner in the layer "a" and the layer "b", the phase difference plate of the present invention can satisfy the relationship of $n_x > n_z > n_y$ as the whole multilayer body including the layer "a" and the layer "b", where $n_x$ is the in-plane refractive index along the retarded phase axis, $n_y$ is the in-plane refractive index in a direction orthogonal thereto, and $n_z$ is the refractive index in the thickness direction. The phase difference plate is thus configured to thereby realize the polarizing plate compensation function.

The magnitude of the phase difference in the layer "a" or the layer "b" generated by the stretching depends on the configuration of the multilayer body for manufacturing phase difference plates (e.g., the number and the thickness of each layer), the stretching temperature, and the stretching ratio. Accordingly, the configuration of the multilayer body for manufacturing phase difference plates may be determined in accordance with the optical function that is desired to be realized such as the polarizing plate compensation function. Thus, the configuration of the multilayer body for manufacturing phase difference plates and the stretching temperature and the stretching ratio for stretching may be determined so as to give the phase difference to the phase difference plate of the present invention as specified in Equations 1 to 4, whereby the polarizing plate compensation function can be given to the phase difference plate of the present invention. Accordingly, the configuration of the multilayer body for manufacturing phase difference plates may be set in various ways.

Among those settings, the multilayer body for manufacturing phase difference plates may preferably satisfy the requirement that the phase of linearly polarized light which is incident perpendicular to the plane of film and has the oscillation plane of the electric vector in the XZ-plane (this light may be referred to hereinafter as the "XZ polarized light") relative to the phase of the linearly polarized light which is incident perpendicular to the plane of film and has the oscillation plane of the electric vector in the YZ-plane (this light may be referred to hereinafter as the "YZ polarized light")

retards when the multilayer body is uniaxially stretched in the X-axis direction at one of the temperatures T1 and T2 (usually at the temperature T1), and advances when the multilayer body is uniaxially stretched in the X-axis direction at the other of the temperatures T1 and T2 (usually at the temperature T2), where the X-axis is a stretching direction for a certain direction (i.e., a uniaxial stretching direction), the Y-axis is a direction orthogonal to the uniaxial stretching direction within the plane of film, and the Z-axis is the thickness direction of the film (this requirement may be referred to hereinafter as the "requirement P").

The requirement P is satisfied when the aforementioned criteria are satisfied as to at least one of the various directions in the plane of the multilayer body for manufacturing phase difference plates being taken as the X-axis. Since the multilayer body for manufacturing phase difference plates is usually an isotropic raw material film, satisfaction of the requirement P with one in-plane direction being the X-axis usually results in satisfaction of the requirement P with all directions being the X-axis.

With a film in which a retarded phase axis appears on the X-axis by uniaxial stretching, the XZ polarized light phase retards relative to that of the YZ polarized light. Conversely, with a film in which an advanced phase axis appears on the X-axis by uniaxial stretching, the XZ polarized light phase advances relative to that of the YZ polarized light.

The multilayer body for manufacturing phase difference plates of the present invention makes use of these properties and is usually a film in which the manner of appearing the retarded phase axis or the advanced phase axis depends on the stretching temperature. Such temperature dependency of the phase difference expression may be controlled, for example, by adjusting the photoelastic modulus of the resin A and the resin B in the layer "a" and the layer "b" as well as the thickness ratio relation between the respective layers.

The in-plane phase difference may be determined by multiplying a difference between the refractive index $n_x$ and the refractive index $n_y$ ($=|n_x-n_y|$) by thickness d, wherein the refractive index $n_x$ is the refractive index in the stretching direction or along the X-axis and the refractive index $n_y$ is the refractive index in a direction orthogonal to the stretching direction, i.e., along the Y-axis. The phase difference of the multilayer body wherein the layer "a" and the layer "b" are stacked is determined as the combination of the phase differences of the layer "a" and the layer "b". Therefore, it is preferable to adjust the thicknesses of the layer "a" and the layer "b" so that (i) stretching at the lower temperature T2 causes the absolute value of the phase difference expressed by the resin having a higher glass transition temperature to be less than the absolute value of the phase difference expressed by the resin having a lower glass transition temperature, and (ii) stretching at the higher temperature T1 causes the absolute value of the phase difference expressed by the resin having a lower glass transition temperature to be less than the absolute value of the phase difference expressed by the resin having a higher glass transition temperature, whereby stretching at the higher temperature T1 and stretching at the lower temperature T2 of the multilayer body that includes the layer "a" and the layer "b" result in phase difference expression of opposite signs.

It is thus possible to provide a multilayer body for manufacturing phase difference plates which meets the requirement P by adjusting the difference between the refractive index $N_X$ along the X-axis and the refractive index $N_Y$ along the Y-axis which are expressed in the layer "a" and the layer "b", respectively, by stretching in one direction (i.e., by uniaxial stretching) in combination with adjustment of the thickness of the layer "a" and the thickness of the layer "b". (The requirement P means that the phase of the XZ polarized light relative to that of the YZ polarized light retards when the multilayer body is uniaxially stretched along the X-axis at one of the temperatures T1 and T2 whereas the phase advances when the multilayer body is uniaxially stretched along the X-axis at the other of the temperatures T1 and T2.)

Referring to the drawings, a specific explanation will be made regarding phase difference expression when the multilayer body for manufacturing phase difference plates that meets the requirement P is stretched. FIG. 1 is a view illustrating an example of the temperature dependency of the phase difference Δ of each of the layer "a" and the layer "b" of the multilayer body for manufacturing phase difference plates when the layers are each stretched as well as the temperature dependency of the phase difference Δ when the multilayer body for manufacturing phase difference plates (in this case, the layer "a"+the layer "b") is stretched, assuming that the resin A forming the layer "a" has a higher glass transition temperature $Tg_A$ and the resin B forming the layer "b" has a lower glass transition temperature $Tg_B$. With the multilayer body for manufacturing phase difference plates shown in FIG. 1, when stretching is performed at the temperature $T_b$, the negative phase difference expressed in the layer "b" is greater than the positive phase difference expressed in the layer "a", whereby the layer "a"+the layer "b" results in expression of negative phase difference Δ. On the other hand, when stretching is performed at the temperature $T_a$, the negative phase difference expressed in the layer "b" is less than the positive phase difference expressed in the layer "a", whereby the layer "a"+the layer "b" results in expression of positive phase difference Δ. Thus, by such a combination of stretching steps at the different temperatures $T_a$ and $T_b$, it is possible to stably realize a phase difference plate which has a desired phase difference and a desired optical function as a result of the combination of the phase differences produced by stretching at each temperature.

Enumerating examples of the configuration of the multilayer body for manufacturing phase difference plates, when the resin A is made of a polycarbonate-based resin and the resin B is made of a styrene maleic anhydride copolymer, examples thereof may include those wherein the ratio of the thickness of the layer "a" to the thickness of the layer "b" ('the thickness of the layer "a"'/'the thickness of the layer "b"') is 1/15 or greater, 1/10 or greater, or 1/5 or greater, and 1/4 or less. The temperature dependency of the phase difference expression tends to be reduced both when the layer "a" is excessively thick and when the layer "b" is excessively thick. The aforementioned materials were used as examples of the resin A and the resin B. However, materials other than those mentioned above may also be used as the material for each of the resins A and B, with which the ratio of thickness between the layer "a" and the layer "b" may also be adjusted within the range of the aforementioned numerical values.

The total thickness of the multilayer body for manufacturing phase difference plates may be preferably 10 μm or greater, more preferably 20 μm or greater, and particularly preferably 30 μm or greater, and preferably 500 μm or less, more preferably 200 μm or less, and even 150 μm or less. A thin multilayer body for manufacturing phase difference plates that is thinner than the lower limit of the aforementioned range may result in insufficient phase difference and insufficient mechanical strength, whereas a thick multilayer body that is thicker than the upper limit of the aforementioned range may cause deterioration in flexibility which may cause problems in handling.

With the multilayer body for manufacturing phase difference plates, it is preferable that unevenness of the thickness of the layer "a" and the layer "b" on the entire surface is 1 µm or less. This enables reduction in color tone unevenness of the phase difference plate of the present invention. This also enables the phase difference plate of the present invention that cause color tone change in a uniform manner after a long time period of use.

In order to reduce unevenness of the thickness of the layer "a" and the layer "b" to 1 µm or less across the entire surface, for example, the following steps may be taken:
(1) providing the extruder with a polymer filter having a mesh opening of 20 µm or less;
(2) rotating the gear pump at 5 rpm or greater;
(3) disposing surrounding units around the die;
(4) limiting air gap to 200 mm or less;
(5) performing edge pinning when casting the film on the cooling rolls; and
(6) using, as the extruder, a biaxial extruder or a double-flight screw type uniaxial extruder.

The thickness of the layer "a" and the layer "b" may be measured as follows. First, using a commercially available contact type thickness meter, the total thickness of the film is measured. Then the portion the thickness of which has been measured is cut and the cross section of that portion is observed under an optical microscope to determine the thickness ratio of each layer. The thickness of each layer may be calculated on the basis of the ratio. The aforementioned measurement may be performed at certain intervals in the MD direction (the direction in which the film flows) and in the TD direction (the direction of width of the film) of the film, whereby the average and unevenness of the thickness values can be determined.

The thickness unevenness may be calculated from the following equation with the standard arithmetic average value $T_{ave}$ of the measured values that are measured in the aforementioned manner, together with the maximum value $T_{max}$ and minimum value $T_{min}$ of the measured thickness T:

The thickness unevenness (µm)=greater one of $T_{ave}-T_{min}$ and $T_{max}-T_{ave}$.

It is preferable that the multilayer body for manufacturing phase difference plates has a total optical transmittance of 85% or greater. When the total optical transmittance is smaller than 85%, the resulting phase difference plate of the present invention may not become suitable as an optical member. The optical transmittance may be measured in accordance with JIS K0115 using a spectrophotometer (manufactured by JASCO Corporation, ultraviolet visible near-infrared spectrophotometer "V-570").

The multilayer body for manufacturing phase difference plates may have a haze of preferably 5% or less, more preferably 3% or less, and particularly preferably 1% or less. A low haze realizes enhancement of the sharpness of a display image on a display device into which the phase difference plate of the present invention is incorporated. The haze is an average value determined from five measured points in accordance with JIS K7361-1997 using a turbidimeter NDH-300A manufactured by Nippon Denshoku Industries Co., Ltd.

The multilayer body for manufacturing phase difference plates has ΔYI of preferably 5 or less, and more preferably 3 or less. A ΔYI lying within the aforementioned range ensures a good visibility with no coloring. The ΔYI is measured in accordance with ASTM E313 using spectrocolorimeter SE 2000 manufactured by Nippon Denshoku Industries Co., Ltd. The same measurement is repeated five times and the arithmetic average of the measurements is calculated.

It is preferable that the multilayer body for manufacturing phase difference plates has a JIS pencil hardness of H or greater. The JIS pencil hardness may be adjusted by changing the type of resin or by changing the thickness of the resin layer. The JIS pencil hardness is determined in accordance with JIS K5600-5-4. Scratching on the surface of the film is performed with pencils with a variety of hardness which are inclined at the angle of 45 degrees to which 500 gram-force of downward load is applied. The hardness is determined as the softest pencil that creates scratches.

It is preferable that multilayer body for manufacturing phase difference plates has an outer surface which is flat with substantially no linear recessed portion or linear projected portion (i.e., die line) which otherwise occurs irregularly in an extending manner along the MD direction. As used herein, the expression "being flat with substantially no linear recessed portion or linear projected portion which otherwise occurs irregularly" means that even if a linear recessed portion or a linear projected portion is formed, the linear recessed portion has a depth of less than 50 nm or a width of greater than 500 nm and the linear projected portion has a height of less than 50 nm or a width of greater than 500 nm. More preferably, the linear recessed portion has a depth of less than 30 nm or a width of greater than 700 nm, and the linear projected portion has a height of less than 30 nm or a width of greater than 700 nm. Such a configuration realizes prevention of optical interference or light leakage caused by refraction of light at the linear recessed portion or the linear projected portion, thereby providing improved optical performance. The expression "irregularly occurring" means "being formed at an unintended position in an unintended size or shape".

The aforementioned depth of the linear recessed portion, the height of the linear projected portion, and the width thereof may be determined by the method described below. The multilayer body for manufacturing phase difference plates is irradiated with light and the transmitted light is projected onto a screen. A film of 30 mm square corresponding to the portion of the bright and dark stripes of light (in this portion, the linear recessed portion has a great depth and the linear projected portion has a great height) which appear on the screen is then cut out. The surface of the cut-out film piece is observed under a three-dimensional surface structure analysis microscope (with a visual field area of 5 mm×7 mm). The observed image is converted into a three-dimensional image, from which a cross-sectional profile is determined. The cross-sectional profile is obtained at intervals of 1 mm in the visual field area.

An average line is drawn on the cross-sectional profiles. The length from the average line to the bottom of the linear recessed portion is the depth of the linear recessed portion, while the length from the average line to the top of the linear projected portion is the height of the linear projected portion. The distance between the intersections between the average line and the profile is the width. Maximum values are obtained from the measured values of the depth of the linear recessed portion and the height of the linear projected portion, and then the widths of the linear recessed portion and the linear projected portion which exhibit those maximum values are obtained. The maximum depth of the linear recessed portion and the maximum height of the linear projected portion, which have been determined as described above, and the widths of the linear recessed portion and the linear projected portion, which exhibit those maximum values, are taken as the depth of the linear recessed portion and the height of the linear projected portion of the film and the widths thereof.

[1-2. First Stretching Step]

In the first stretching step, the multilayer body for manufacturing phase difference plates is stretched at the temperature T1 in one direction. That is, the multilayer body for manufacturing phase difference plates is uniaxially stretched at the temperature T1. Stretching at the temperature T1 causes a phase difference in each of the layer "a" and the layer "b" depending on factors such as the configuration of the multilayer body for manufacturing phase difference plates, the stretching temperature T1, and the stretching ratio. This also causes a phase difference on the entire multilayer body for manufacturing phase difference plates which includes the layer "a" and the layer "b". At this time, for example, when the multilayer body for manufacturing phase difference plates satisfies the requirement P, the phase of the XZ polarized light relative to that of the YZ polarized light is retarded or advanced.

With reference to the glass transition temperature $Tg_A$ of the resin A and the glass transition temperature $Tg_B$ of the resin B, the temperature T1 is preferably higher than $Tg_B$, and more preferably higher than $Tg_B+5°$ C., and may be lower than $Tg_A+40°$ C., lower than $Tg_A+20°$ C., or lower than $Tg_A+10°$ C. With the temperature T1 being higher than the lower limit of the temperature range, the phase difference Reb and Rtb of the layer "b" can be stably accommodated within the desired range, while with the temperature T1 being lower than the upper limit of the temperature range, the phase difference Rea and Rta of the layer "a" can be stably accommodated within the desired range.

The uniaxial stretching may be performed by conventionally known methods. Examples thereof may include a method for uniaxial stretching in the lengthwise direction (which usually coincides with the MD direction) using the difference in peripheral speed between rolls, and a method for uniaxial stretching in the crosswise direction (which usually coincides with the TD direction) using a tenter. The method for uniaxial stretching in the lengthwise direction may be, for example, an IR heating system between rolls or a floating system, among which the floating system is preferred from the viewpoint of obtaining a phase difference plate having a high optical uniformity. On the other hand, the method for uniaxial stretching in the crosswise direction may include the tenter method.

At the time of stretching, in order to reduce unevenness in stretching amount and in thickness, a temperature difference may be created in the width direction of the film in the stretching zone. Such a temperature difference in the width direction of the film in the stretching zone may be created by known techniques, such as heating control by adjusting the opening of warm-air nozzles in the width direction, or by providing IR heaters arrayed in the width direction.

[1-3. Second Stretching Step]

After the first stretching step, a second stretching step is performed. In the second stretching step, the multilayer body for manufacturing phase difference plates which has been unidirectionally stretched in the first stretching step is stretched in another direction that is approximately orthogonal to the stretching direction in the first stretching step. As used herein, the expression, "being approximately orthogonal" means that the angle formed between the stretching direction in the first stretching step and the stretching direction in the second stretching step is usually 85 degrees or greater, and preferably 89 degrees or greater, and usually 95 degrees or less, and preferably 91 degrees or less.

In the second stretching step, the multilayer body for manufacturing phase difference plates is stretched at the temperature T2 that is lower than the temperature T1. That is, the multilayer body for manufacturing phase difference plates is uniaxially stretched at the relatively low temperature T2. Stretching at the temperature T2 causes a phase difference in each of the layer "a" and the layer "b" depending on factors such as the configuration of the multilayer body for manufacturing phase difference plates, the stretching temperature T2, and the stretching ratio. This also causes a phase difference on the entire multilayer body for manufacturing phase difference plates which includes the layer "a" and the layer "b". At this time, in a case wherein the multilayer body for manufacturing phase difference plates meets the requirement P, the stretching in the second stretching step causes the phase of the XZ polarized light relative to that of the YZ polarized light to advance when the stretching in the first stretching step has caused the phase of the XZ polarized light relative to that of the YZ polarized light to be retarded, and the stretching in the second stretching step causes the phase of the XZ polarized light relative to that of the YZ polarized light to be retarded when the stretching in the first stretching step has caused the phase of the XZ polarized light relative to that of the YZ polarized light to be advanced.

With reference to the glass transition temperature $Tg_B$ of the resin B, the temperature T2 is preferably higher than $Tg_B-20°$ C., and more preferably higher than $Tg_B-10°$ C., and preferably lower than $Tg_B+5°$ C., and more preferably lower than $Tg_B$. With the stretching temperature T2 being higher than the lower limit of the aforementioned temperature range, the rupture or white turbidity of the multilayer body for manufacturing phase difference plates that may occur during stretching can be prevented, while with the stretching temperature T2 being lower than the upper limit of the aforementioned temperature range, the phase difference Reb and Rtb of the layer "b" can be stably accommodated within the desired range.

Furthermore, the difference between the temperature T1 and the temperature T2 is usually 5° C. or greater, or preferably 10° C. or greater. With such a great difference between the temperature T1 and the temperature T2, the polarizing plate compensation function of the phase difference plate can be stably expressed. There is no specific upper limit of the difference between the temperature T1 and the temperature T2. However, the upper limit is 100° C. or smaller from the viewpoint of industrial productivity.

As the method for uniaxial stretching in the second stretching step, the same method as the one that can be employed for the uniaxial stretching in the first stretching step is applicable. However, the uniaxial stretching in the second stretching step is preferably performed at a stretching ratio less than that at which the uniaxial stretching in the first stretching step is performed. More specifically, it is preferable that the first stretching ratio is two to four times, and the second stretching ratio is 1.1 to 2 times.

The combination of the directions of stretching in the first stretching step and the second stretching step may be, for example, as follows: lengthwise stretching in the first stretching step and crosswise stretching in the second stretching step; crosswise stretching in the first stretching step and lengthwise stretching in the second stretching step; or stretching in a diagonal direction in the first stretching step and stretching in another diagonal direction that is approximately orthogonal thereto in the second stretching step. Among these combinations, a combination of crosswise stretching in the first stretching step and lengthwise stretching in the second stretching step is preferable. This is because performing the second stretching step at a low stretching ratio in the lengthwise direction can reduce unevenness of the direction of the optical axis across the entire width of the resulting phase difference plate. The lengthwise direction and the crosswise direction are usually approximately orthogonal to each other.

As a result of the first stretching step and the second stretching step of the multilayer body for manufacturing phase difference plates, phase differences are given to the layer "a" and the layer "b" in each of the first stretching step and the second stretching step depending on the stretching temperature, the stretching direction, and the stretching ratio. Accordingly, in the phase difference plate of the present invention which is obtained through the first stretching step and the second stretching step, the phase differences that occur in the layer "a" and the layer "b" during each of the first stretching step and the second stretching step are combined, whereby a phase difference which is sufficient for realizing optical functions such as the polarizing plate compensation function is obtained.

The aforementioned method for manufacturing phase difference plates is simpler in terms of the steps than conventional methods, and thus can be expected to provide improved productivity.

For example, in the technique disclosed in Patent Document 1, a desired phase difference plate was produced by applying contractive force to a resin film with a contractive film. With this technique, control of the direction and level of contraction was complicated. Furthermore, in the method employing the contractive film, the magnitude of contractive force varied depending on the thickness of the contractive film and the conditions for contraction, which made it difficult to accurately control the contraction. Thus with this method, it was difficult to manufacture a phase difference plate having a great width. In contrast to this, in the aforementioned method for manufacturing phase difference plates, the multilayer body for manufacturing phase difference plates merely has to be stretched, whereby manufacture steps are simplified and the method can be easily performed. Furthermore, the aforementioned method for manufacturing phase difference plates does not require contraction but merely requires stretching, and the accuracy of stretching can be relatively easily regulated. Therefore the method facilitates manufacture of the phase difference plate having a great width.

Alternatively, for example, it is also conceivable to separately prepare films having different phase differences and affix the films to each other, thereby manufacturing a phase difference plate having a polarizing plate compensation function. However, in this case, the angle at which the films were affixed to each other required accurate adjustments and the adjustments were complicated. Furthermore, using an adhesive for affixing the films to each other requires an apparatus and time to harden the adhesive, which was also complicated. In contrast to this, in the aforementioned method for manufacturing phase difference plates, the stretching is carried out after the multilayer body for manufacturing phase difference plates has been prepared. This eliminates the necessity for adjusting the affixing angle, and reduces the burdensome tasks. Therefore the method can be easily performed, whereby increase in productivity can thereby be expected. Furthermore, since the adjustment of the affixing angle is unnecessary, the accuracy of the retarded phase axis can be easily improved. Therefore improvement in quality can thereby be expected.

[1-4. Other Steps]

In the method for manufacturing phase difference plates of the present invention, it is possible to perform an optional step in addition to the step of forming the multilayer body, the first stretching step, and the second stretching step which have been mentioned above.

For example, before stretching the multilayer body for manufacturing phase difference plates, a step of preheating the multilayer body for manufacturing phase difference plates (the preheating step) may be additionally performed. Examples of means for heating the multilayer body for manufacturing phase difference plates may include an oven-type heating device, a radiation heating device, or soaking the multilayer body in a liquid. Among these means, the oven-type heating device is preferable. The heating temperature in the preheating step is usually the stretching temperature−40° C. or higher, and preferably the stretching temperature−30° C. or higher, and usually the stretching temperature+20° C. or lower, and preferably the stretching temperature+15° C. or lower. The stretching temperature means the temperature set in the heating device.

Furthermore, after the first stretching step and/or the second stretching step, the stretched film may be subjected to a fixing process. The temperature for the fixing is usually the room temperature or higher, and preferably the stretching temperature−40° C. or higher, and usually the stretching temperature+30° C. or lower, and preferably the stretching temperature+20° C. or lower.

[2. Phase Difference Plate of the Present Invention]

The phase difference plate of the present invention is obtained by the aforementioned manufacturing method. The phase difference plate of the present invention has a multilayer structure which includes at least the layer "a" containing the resin A and the layer "b" containing the resin B. In the layer "a" and the layer "b" of the phase difference plate of the present invention, phase differences are expressed as a result of the stretching in the first and second stretching steps. More specifically, the phase difference plate of the present invention is configured such that the in-plane retardation Rea and the thickness direction retardation Rta of the layer "a" as well as the in-plane retardation Reb and the thickness direction retardation Rtb of the layer "b" satisfy the following equations 1 to 4:

$$0 \text{ nm} < Rea < 50 \text{ nm} \qquad \text{Equation 1}$$

$$50 \text{ nm} < Rta < 100 \text{ nm} \qquad \text{Equation 2}$$

$$100 \text{ nm} < Reb < 150 \text{ nm} \qquad \text{Equation 3}$$

$$-100 \text{ nm} < Rtb < -40 \text{ nm} \qquad \text{Equation 4}$$

Equations 1 to 4 will be discussed hereinbelow in more detail.

The in-plane retardation Rea of the layer "a" of the phase difference plate of the present invention is usually greater than 0 nm, preferably greater than 5 nm, and more preferably greater than 10 nm, and usually less than 50 nm, preferably less than 45 nm, and more preferably less than 40 nm.

The thickness direction retardation Rta of the layer "a" of the phase difference plate of the present invention is usually greater than 50 nm, preferably greater than 60 nm, and more preferably greater than 70 nm, and usually less than 100 nm, preferably less than 95 nm, and more preferably less than 90 nm.

The in-plane retardation Reb of the layer "b" of the phase difference plate of the present invention is usually greater than 100 nm, preferably greater than 110 nm, and more preferably greater than 120 nm, and usually less than 150 nm, preferably less than 145 nm, and more preferably less than 140 nm.

The thickness direction retardation Rtb of the layer "b" of the phase difference plate of the present invention is usually greater than −100 nm, preferably greater than −90 nm, and more preferably greater than −80 nm, and usually less than −40 nm, preferably less than −50 nm, and more preferably less than −60 nm.

By setting the in-plane retardation Rea and the thickness direction retardation Rta of the layer "a" as well as the in-plane retardation Reb and the thickness direction retardation Rtb of the layer "b" within the aforementioned range, the phase difference plate of the present invention can exert the polarizing plate compensation function. Adjustment of these retardations Rea, Rta, Reb, and Rtb may be achieved by adjusting the stretching ratios and the stretching temperatures in the first stretching step and the second stretching step.

The in-plane retardation of each layer (Rea and Reb) is a value represented by |Nx−Ny|×Th, (where Nx represents a refractive index in a direction that is perpendicular to the thickness direction (i.e., in the in-plane direction) and that gives the maximum refractive index, Ny represents a refractive index in a direction that is perpendicular to the thickness direction (i.e., in the in-plane direction) and orthogonal to the direction of Nx, and Th represents the thickness). The thickness direction retardation of each layer (Rta and Rtb) is a value represented by {|Nx+Ny|/2−Nz}×Th (where Nx represents a refractive index in a direction that is perpendicular to the thickness direction (i.e., in the in-plane direction) and that gives the maximum refractive index, Ny represents a refractive index in a direction that is perpendicular to the thickness direction (i.e., in the in-plane direction) and orthogonal to the direction of Nx, Nz represents a refractive index in the thickness direction, and Th represents the thickness). All of the retardations are the values evaluated with a light beam having a wavelength of 550 nm.

Each of the retardations Rea, Rta, Reb, and Rtb may be measured by the spectroscopic ellipsometer M-2000U manufactured by J. A. Woollam.

In the phase difference plate of the present invention, the ratio $R_{40}/Re$, i.e. the ratio of the retardation $R_{40}$ at an incident angle of 40 degrees relative to the retardation Re at an incident angle of 0 degree, is preferably 0.92 or greater, and more preferably 0.95 or greater, and preferably 1.08 or less, and more preferably 1.05 or less. By satisfying such a relationship of Re and $R_{40}$, it is possible to reduce color tone unevenness depending on the angle of observation on a display device which includes the phase difference plate of the present invention.

In the phase difference plate of the present invention, the retardation Re at an incident angle of 0 degree is preferably 50 nm or greater, and more preferably 100 nm or greater, and preferably 400 nm or less, and more preferably 350 nm or less.

As used herein, the incident angle of 0 degree is the direction normal to the phase difference plate, while the incident angle of 40 degrees is the direction that is tilted by 40 degrees with respect to the direction normal to the phase difference plate. In the measurement of $R_{40}$, the direction for tilting the observation angle is not limited to a specific one, and this requirement is satisfied when the value of $R_{40}$ obtained with any of one tilting direction satisfies the requirement.

Furthermore, the retardations Re and $R_{40}$ may be measured at any wavelength within the visible light region, preferably at 550 nm.

The retardations Re and $R_{40}$ at incident angles of 0 degree and 40 degrees may be measured by the parallel Nicol rotation method using KOBRA-WR manufactured by Oji Scientific Instruments.

It is preferable that the phase difference plate of the present invention is configured such that the refractive index $n_x$ along the in-plane retarded phase axis, the refractive index $n_y$ in an in-plane direction orthogonal thereto, and the refractive index $n_z$ in the thickness direction meet the relationship of $n_x > n_z > n_y$.

In the aforementioned inequality, the refractive indices $n_x$, $n_z$, and $n_y$ are calculated based on Re and $R_{40}$, the thickness of the phase difference plate, and the average refractive index $n_{ave}$ of the phase difference plate. $n_{ave}$ is determined by the following equation.

$$n_{ave} = \Sigma(n_i \times L_i)/\Sigma L_i$$

$n_i$: the refractive index of resin of layer "i"
$L_i$: the thickness of layer "i"

The phase difference plate of the present invention may be a plate which shrinks in the lengthwise and crosswise directions by heat treatment at 60° C. and 90% RH for 100 hours. However, the shrinkage ratio may be preferably 0.5% or less, and more preferably 0.3% or less. An excessive shrinkage causes the phase difference plate of the present invention to be deformed due to shrinkage stress when the phase difference plate is used in a high-temperature high-humidity environment, and the plate may possibly peel off the display device.

The thickness of the phase difference plate of the present invention is preferably 10 μm or greater, and more preferably 30 μm or greater, and preferably 200 μm or less, and more preferably 150 μm or less, in terms of the total thickness of the layer "a" and the layer "b".

Furthermore, it is preferable that unevenness of the thickness of the layer "a" and the layer "b" on the entire surface is 1 μm or less. This enables reduction in color tone unevenness. This also realizes a uniformity in color tone after a long time period of use. This may be realized by adjusting unevenness of the thickness of the layer "a" and the layer "b" of the multilayer body for manufacturing phase difference plates on the entire surface to 1 μm or less.

The phase difference plate of the present invention is the same as the multilayer body for manufacturing phase difference plates as to the total optical transmittance, the haze, the ΔYI, the JIS pencil hardness, and the flatness on the outer surface preferably having substantially no linear recessed and projected portions.

The phase difference plate of the present invention may also have an optional layer other than the layer "a" and the layer "b". Examples of the optional layer may include an adhesive layer for adhering the layer "a" and the layer "b", a mat layer for providing improved slipperiness to the film, a hard coat layer such as a impact-resistant polymethacrylate resin layer, an antireflective layer, or an antifouling layer.

The size of the phase difference plate of the present invention in the direction of width may be 1500 mm to 2000 mm.

[3. Liquid Crystal Display Device]

The phase difference plate of the present invention has a good polarizing plate compensation function. Therefore the plate alone and a combination of the plate with another member are applicable to a liquid crystal display device.

The liquid crystal display device usually includes a pair of polarizing plates (the light incident side polarizing plate and the light emitting side polarizing plate) disposed so that the absorption axes are approximately orthogonal to each other and a liquid crystal cell that is interposed between the pair of polarizing plates. As used herein, the expression "being approximately orthogonal" means that the angle formed by the absorption axes is usually 85 degrees or greater, and preferably 89 degrees or greater, and usually 95 degrees or less, and preferably 91 degrees or less.

When the phase difference plate of the present invention is provided in the liquid crystal display device, the phase difference plate of the present invention is interposed between either one of the pair of polarizing plates and the liquid crystal cell. At this time, the phase difference plate of the present invention may be provided on the light incident side of the liquid crystal cell, on the light emitting side of the liquid crystal cell, or both the light incident side and the light emitting side of the liquid crystal cell. Usually, the pair of polarizing plates, the phase difference plate of the present invention, and the liquid crystal cell are integrated as a liquid crystal panel, so that the liquid crystal panel is illuminated with light from a light source, whereby images are displayed on the display screen that exists on the light emitting side of the liquid crystal panel. At this time, since the phase difference plate of the present invention exerts a good polarizing plate compensation function, it is possible to reduce light leakage which otherwise occurs when the display screen of the liquid crystal display device is observed from a tilted angle. Furthermore, the phase difference plate of the present invention usually has good optical functions in addition to the polarizing plate compensation function, thus making it possible to improve visibility of the liquid crystal display device.

Examples of display modes of the liquid crystal cells may include those of in-plane switching (IPS) type, vertical alignment (VA) type, multi-domain vertical alignment (MVA) type, continuous pin wheel alignment (CPA) type, hybrid alignment nematic (HAN) type, twisted nematic (TN) type, super-twisted nematic (STN) type, optically compensated bend (OCB) type, and blue phase mode type. Among these types, the in-plane switching type and the vertical alignment type are preferable, and the in-plane switching type is particularly preferable. The liquid crystal cells of the in-plane switching type themselves have a wide viewing angle. Application thereto of the phase difference plate of the present invention can realize a further widened viewing angle.

The phase difference plate of the present invention may be affixed to the liquid crystal cell or the polarizing plate. For achieving adhesion, it is possible to employ a well-known adhesive.

It is possible to use solely one leaf of phase difference plate of the present invention or to use two or more leaves of the plates.

Furthermore, the phase difference plate of the present invention may be provided in the liquid crystal display device in combination with another phase difference plate. For example, in the case wherein the phase difference plate of the present invention is provided in a liquid crystal display device which includes the liquid crystal cell of the vertical alignment type, another phase difference plate for improving viewing angle characteristics may additionally be provided between the pair of polarizing plates in addition to the phase difference plate of the present invention.

[4. Other Matters]

The phase difference plate of the present invention may be used for usages other than those mentioned above.

For example, the in-plane retardation Re of the phase difference plate of the present invention may be adjusted to 120 nm to 160 nm, whereby the phase difference plate of the present invention is configured to be a ¼ wavelength plate. The ¼ wavelength plate may be combined with a linear polarizer to configure a circular polarizing plate. In this case, the angle formed by the retarded phase axis of the ¼ wavelength plate and the absorption axis of the linear polarizer is preferably 45±2 degrees.

Furthermore, the phase difference plate of the present invention may also be employed as a protective film for the polarizing plate. A polarizing plate usually includes a polarizer and a protective film affixed to both sides thereof. The phase difference plate of the present invention may be affixed to the polarizer, whereby the phase difference plate of the present invention may be used as the protective film. In this case, the protective film is omitted, and the thickness of the liquid crystal display device can thereby be reduced.

The liquid crystal display device of the present invention has an omnidirectional contrast which is usually 60 or greater, more preferably 80 or greater, and much more preferably 170 or greater. With such a value, the device can have an enhanced display quality when viewed from tilted directions.

EXAMPLES

The present invention will be specifically described with reference to Examples. However, the present invention is not limited to Examples below, but may be modified and changed without deviating from the gist of the present invention and equivalents thereof. As a polarizing plate for Examples and Comparative Example, employed was the polarizing plate LLC 2-9518, manufactured by SANRITZ CORPORATION. The liquid crystal cell employed was the one that had a thickness of 3.349 µm, a birefringence of $\Delta n=0.11$ at a wavelength of 550 nm, and a pretilt angle of 0 degree.

[Evaluation Methods]

(1) Method for Measuring Thickness

The thickness of film was measured with a contact type thickness gauge.

For measuring the thickness of each layer that constitutes the film, the film was embedded in epoxy resin and then sliced with a microtome (product name "RUB-2100" manufactured by YAMATO KOGYO Co., Ltd.) to observe and measure the cross sections thereof under a scanning electron microscope.

(2) Method for Measuring Retardation

On the surfaces of the film on the layer "a" side and the layer "b" side, the refractive index Nx in the lengthwise direction of the film, the refractive index Ny in the width direction, and the refractive index Nz in the thickness direction were each measured at a measurement wavelength of 550 nm using the spectroscopic ellipsometer M-2000U manufactured by J. A. Woollam. Then, from the thicknesses of Th (nm) of the layers, the retardations were calculated by the following equations:

$$Rea \text{ and } Reb = |Nx - Ny| \times Th$$

$$Rta \text{ and } Rtb = (|Nx + Ny|/2 - Nz) \times Th$$

(3) Viewing Angle Characteristics of the Liquid Crystal Display Device

The optical anisotropic body was disposed at a position adjacent to the liquid crystal cell of the liquid crystal display device of the in-plane switching (IPS) mode, and the display properties were visually observed. Furthermore, the contrast that represents the ratio between the luminance of white image and the luminance of black image was determined by optical simulation with a 4×4 matrix, and then illustrated in a contrast contour map.

Preparative Example 1

A film molding apparatus for co-extruding two-type two-layer film was prepared, in which pellets of polycarbonate resin (Wonderlite PC-110, manufactured by Asahi Kasei Corporation, glass transition temperature of 145° C.) were charged into one of the uniaxial extruders having a double flight type screw and then melted.

Pellets of styrene-maleic anhydride copolymer resin (Dylark D332, manufactured by Nova Chemicals, glass transition temperature of 135° C.) were charged into the other uniaxial extruder having a double flight type screw and then melted.

The melted polycarbonate resin at 260° C. was supplied into one of the manifolds of a multi-manifold die (with a dies lip surface roughness Ra of 0.1 µm) through a leaf disk shape polymer filter having a mesh opening of 10 µm. The melted styrene-maleic anhydride copolymer resin at 260° C. was supplied into the other manifold through a leaf disk shape polymer filter having a mesh opening of 10 µm.

The polycarbonate resin and the styrene-maleic anhydride copolymer resin were coextruded from the multi-manifold die at 260° C. to be in a form of a film. The film-shaped melted resin was cast onto a cooling roll which was at a controlled surface temperature of 130° C. and then fed between two cooling rolls which were at a controlled surface temperature of 50° C., to thereby obtain a multilayer body 1 for manufacturing phase difference plates (the step of forming the multilayer body). The multilayer body 1 was formed of the polycarbonate resin layer (the layer "a": 16 µm) and the styrene-maleic anhydride copolymer resin layer (the layer "b": 180 µm) and had a width of 1350 mm and a thickness of 196 µm.

Example 1

The multilayer body 1 obtained in Preparative Example 1 was supplied to a tenter crosswise uniaxial stretching machine and then stretched in the crosswise direction at a stretching temperature of 150° C. at a stretching ratio of 2.7 (the first stretching step). Subsequently, the stretched film was supplied to a lengthwise uniaxial stretching machine and then stretched in the lengthwise direction at a stretching temperature of 128° C. at a stretching ratio of 1.25 to obtain the phase difference plate 1 (the second stretching step).

Figure 2:
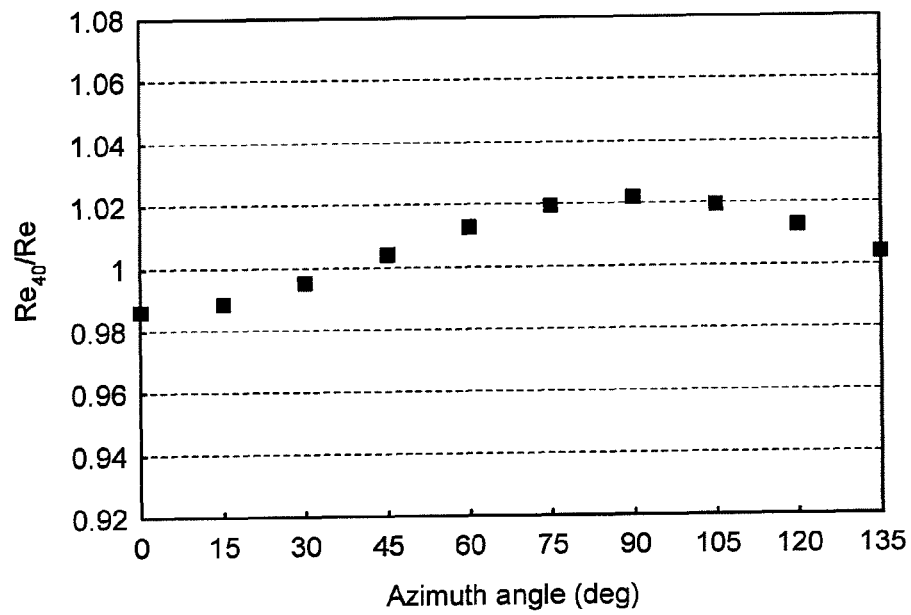
FIG. 2 is a graph of a ratio $R_{40}/Re$ of a phase difference plate 1 manufactured in Example 1 of the present invention plotted in increments of an azimuth angle of 15 degrees, wherein Re is a retardation at an incident angle of 0 degree, and $R_{40}$ is a retardation at an incident angle of 40 degrees.

With regard to the resulting phase difference plate 1, the in-plane retardation Rea and the thickness direction retardation Rta of the layer "a" as well as the in-plane retardation Reb and the thickness direction retardation Rtb of the layer "b" were measured. The results are shown in Table 1. The resulting phase difference plate 1 satisfied the relationship of $n_x > n_z > n_y$. Furthermore, the multilayer body 1 used for manufacturing the phase difference plate 1 satisfied the requirement P. Furthermore, the ratio $R_{40}$/Re between the retardation Re at an incident angle of 0 degree and the retardation $R_{40}$ at an incident angle of 40 degrees of the resulting phase difference plate 1 was plotted in increments of an azimuth angle of 15 degrees. The results are shown in FIG. 2.

Figure 3:
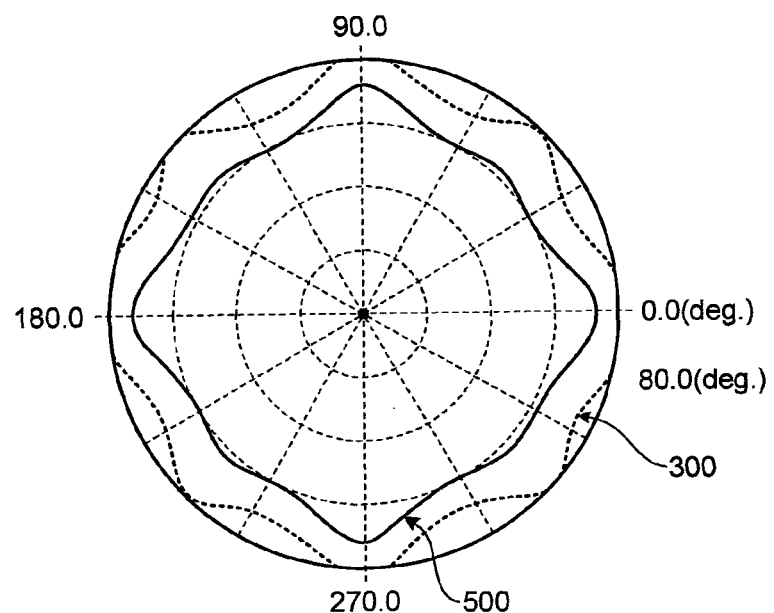
FIG. 3 is a graph illustrating the contrast contour map measured in Example 1 of the present invention.

Furthermore, the resulting phase difference plate 1 was disposed at a position adjacent to the liquid crystal cell of the liquid crystal display device of IPS mode, and display properties thereof were visually observed. As a result, the display was good and uniform when the screen was viewed from the front direction, and also when the screen was viewed from directions tilted to all directions within a polar angle of 80 degrees. With regard to this liquid crystal display device, the omnidirectional contrast obtained by optical simulation with a 4×4 matrix is shown in Table 1 and the contrast contour map is shown in FIG. 3.

Example 2

The multilayer body 1 obtained in Preparative Example 1 was supplied to the tenter crosswise uniaxial stretching machine and then stretched in the crosswise direction at a stretching temperature of 150° C. at a stretching ratio of 2.7 (the first stretching step). Subsequently, the stretched film was supplied to the lengthwise uniaxial stretching machine and then stretched in the lengthwise direction at a stretching temperature of 130° C. at a stretching ratio of 1.35 to obtain a phase difference plate 2 (the second stretching step).

Figure 4:
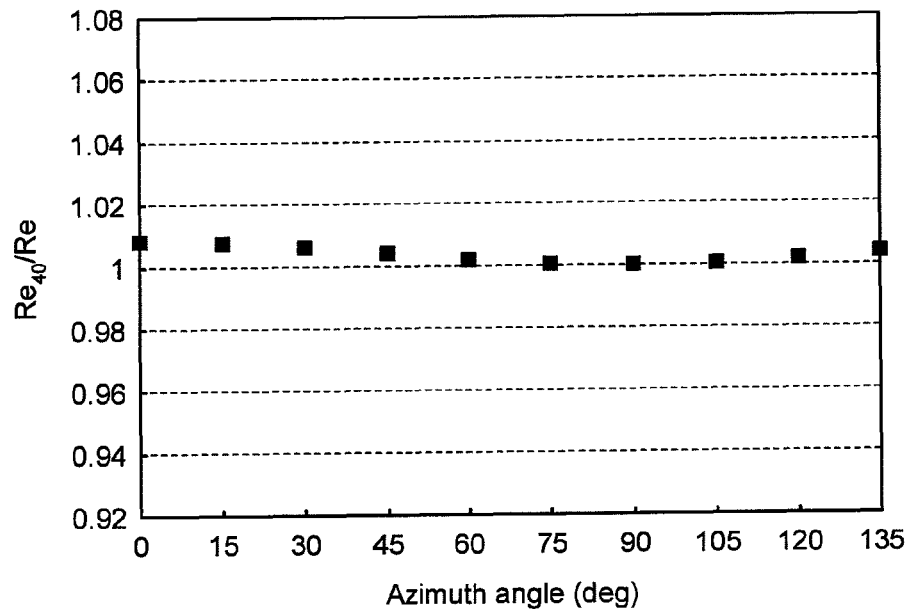
FIG. 4 is a graph of a ratio $R_{40}/Re$ of a phase difference plate 2 manufactured in Example 2 of the present invention plotted in increments of an azimuth angle of 15 degrees, wherein Re is a retardation at an incident angle of 0 degree, and $R_{40}$ is a retardation at an incident angle of 40 degrees.

With regard to the resulting phase difference plate 2, the in-plane retardation Rea and the thickness direction retardation Rta of the layer "a" as well as the in-plane retardation Reb and the thickness direction retardation Rtb of the layer "b" were measured. The results are shown in Table 1. The resulting phase difference plate 2 satisfied the relationship of $n_x > n_z > n_y$. Furthermore, the multilayer body 1 used for manufacturing the phase difference plate 2 satisfied the requirement P. Furthermore, the ratio $R_{40}$/Re between the retardation Re at an incident angle of 0 degree and the retardation $R_{40}$ at an incident angle of 40 degrees of the resulting phase difference plate 2 was plotted in increments of an azimuth angle of 15 degrees. The results are shown in FIG. 4.

Figure 5:
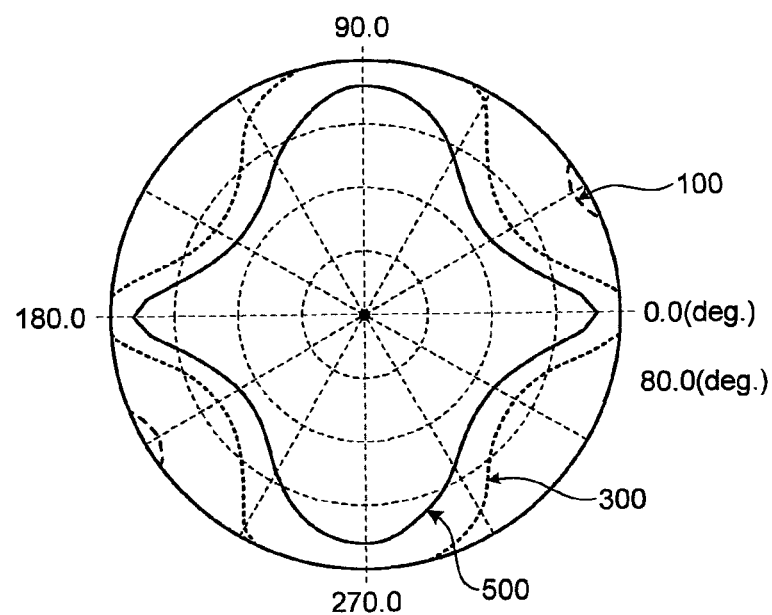
FIG. 5 is a graph illustrating the contrast contour map measured in Example 2 of the present invention.

Furthermore, the display properties of the resulting phase difference plate 2 were visually evaluated in the aforementioned manner. As a result, the display was good and uniform when the screen was viewed from the front direction, and also when the screen was viewed from directions tilted to all directions within a polar angle of 80 degrees. With regard to this liquid crystal display device, the omnidirectional contrast obtained by optical simulation with a 4×4 matrix is shown in Table 1 and the contrast contour map is shown in FIG. 5.

Example 3

The multilayer body 1 obtained in Preparative Example 1 was supplied to the tenter crosswise uniaxial stretching machine and then stretched in the crosswise direction at a stretching temperature of 153° C. at a stretching ratio of 2.7 (the first stretching step). Subsequently, the stretched film was supplied to the lengthwise uniaxial stretching machine and then stretched in the lengthwise direction at a stretching temperature of 130° C. at a stretching ratio of 1.35 to obtain a phase difference plate 3 (the second stretching step).

Figure 6:
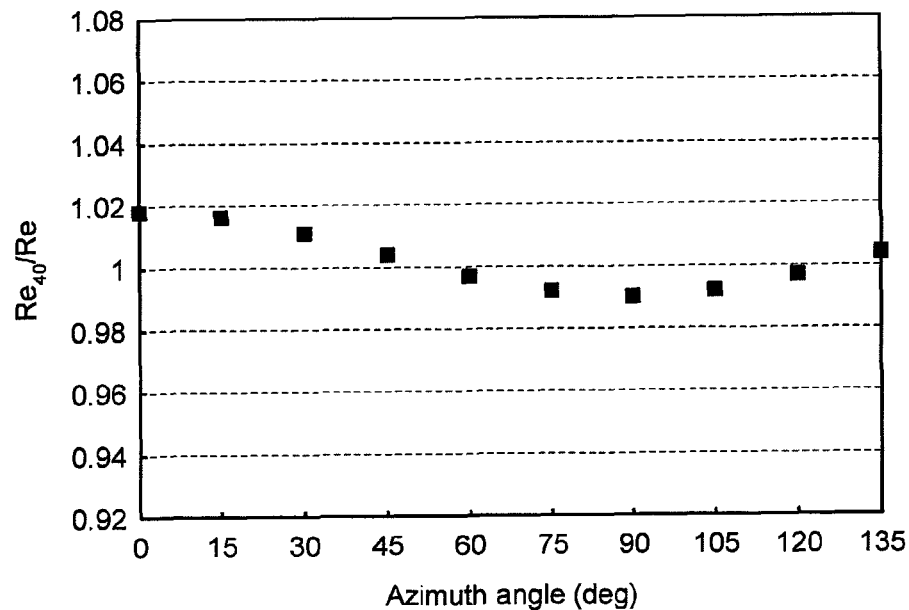
FIG. 6 is a graph of a ratio $R_{40}/Re$ of a phase difference plate 3 manufactured in Example 3 of the present invention plotted in increments of an azimuth angle of 15 degrees, wherein Re is a retardation at an incident angle of 0 degree, and $R_{40}$ is a retardation at an incident angle of 40 degrees.

With regard to the resulting phase difference plate 3, the in-plane retardation Rea and the thickness direction retardation Rta of the layer "a" as well as the in-plane retardation Reb and the thickness direction retardation Rtb of the layer "b" were measured. The results are shown in Table 1. The resulting phase difference plate 3 satisfied the relationship of $n_x > n_z > n_y$. Furthermore, the multilayer body 1 used for manufacturing the phase difference plate 3 satisfied the requirement P. Furthermore, the ratio $R_{40}$/Re between the retardation Re at an incident angle of 0 degree and the retardation $R_{40}$ at an incident angle of 40 degrees of the resulting phase difference plate 3 was plotted in increments of an azimuth angle of 15 degrees. The results are shown in FIG. 6.

Figure 7:
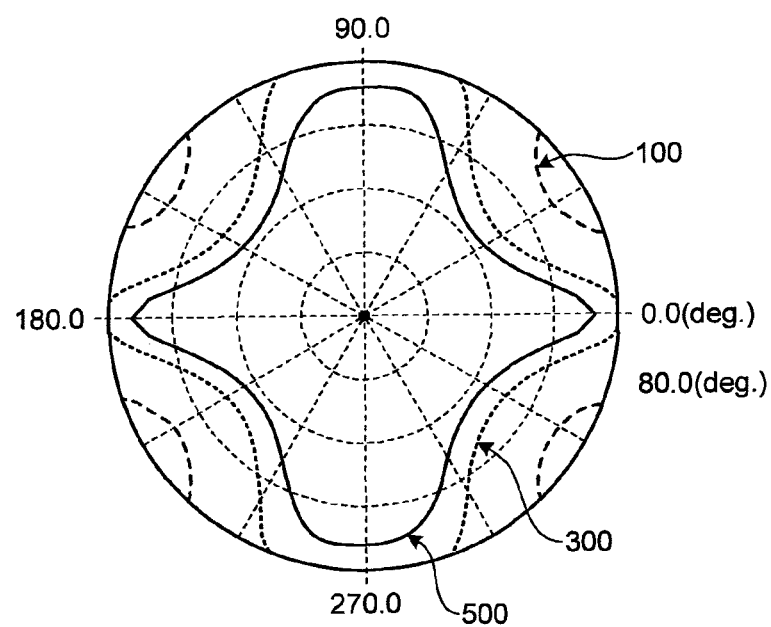
FIG. 7 is a graph illustrating the contrast contour map measured in Example 3 of the present invention.

Furthermore, the display properties of the resulting phase difference plate 3 were visually evaluated in the aforementioned manner. As a result, the display was good and uniform when the screen was viewed from the front direction, and also when the screen was viewed from directions tilted to all directions within a polar angle of 80 degrees. With regard to this liquid crystal display device, the omnidirectional contrast obtained by optical simulation with a 4×4 matrix is shown in Table 1 and the contrast contour map is shown in FIG. 7.

Comparative Example 1

The multilayer body 1 obtained in Preparative Example 1 was supplied to the tenter crosswise uniaxial stretching machine and then stretched in the crosswise direction at a stretching temperature of 150° C. at a stretching ratio of 2.7

(the first stretching step). Subsequently, the stretched film was supplied to the lengthwise uniaxial stretching machine and then stretched in the lengthwise direction at a stretching temperature of 150° C. at a stretching ratio of 1.25 to obtain a phase difference plate 4 (the second stretching step).

Figure 8:
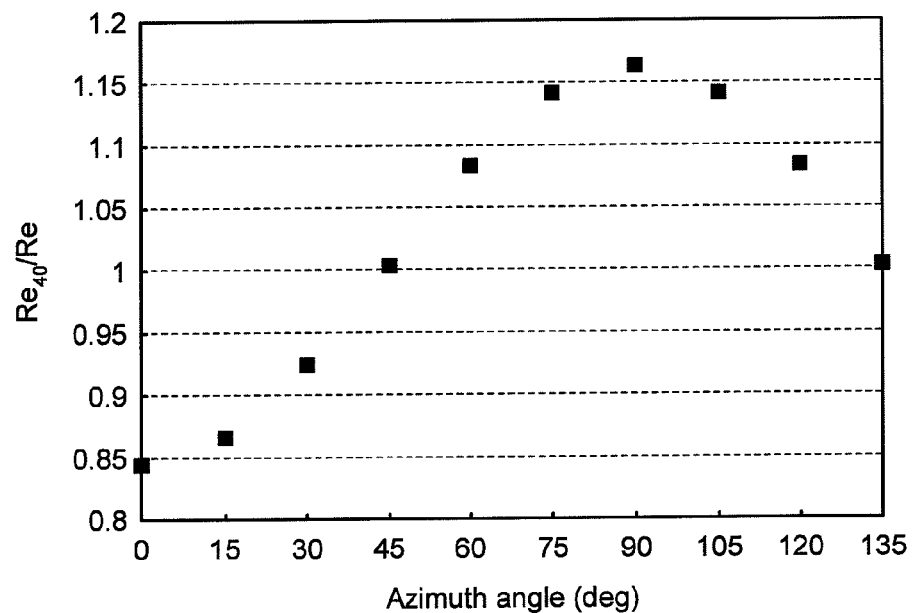
FIG. 8 is a graph of a ratio $R_{40}/Re$ of a phase difference plate 4 manufactured in Comparative Example 1 of the present invention plotted in increments of an azimuth angle of 15 degrees, wherein Re is a retardation at an incident angle of 0 degree, and $R_{40}$ is a retardation at an incident angle of 40 degrees.

With regard to the resulting phase difference plate 4, the in-plane retardation Rea and the thickness direction retardation Rta of the layer "a" as well as the in-plane retardation Reb and the thickness direction retardation Rtb of the layer "b" were measured. The results are shown in Table 1. Furthermore, the ratio $R_{40}/Re$ between the retardation Re at an incident angle of 0 degree and the retardation $R_{40}$ at an incident angle of 40 degrees of the resulting phase difference plate 4 was plotted in increments of an azimuth angle of 15 degrees. The results are shown in FIG. 8.

Figure 9:
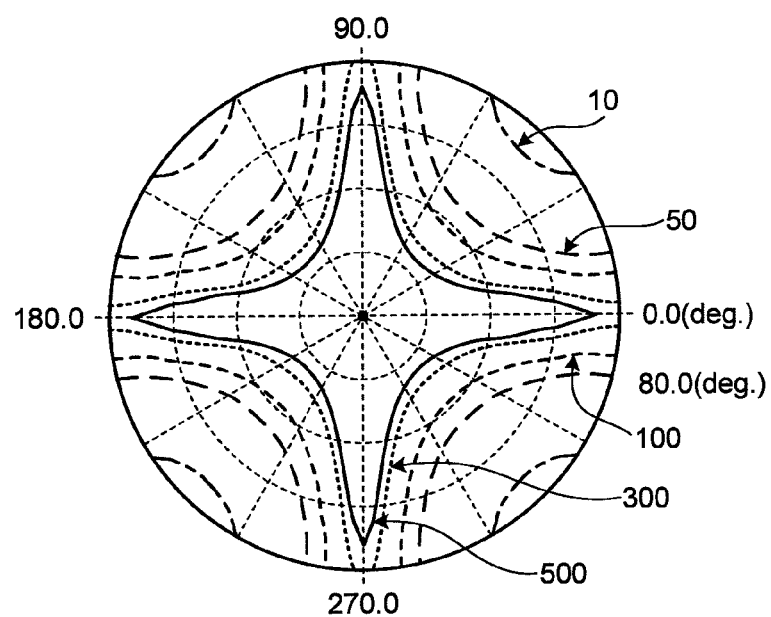
FIG. 9 is a graph illustrating the contrast contour map measured in Comparative Example 1.

Furthermore, the display properties of the resulting phase difference plate 4 were visually evaluated in the aforementioned manner. As a result, the display was good when the screen was viewed from the front direction. However, when the screen was viewed from directions tilted within a polar angle of 80 degrees, a large amount of light leakage was observed, and the display performance was considerably poor. With regard to this liquid crystal display device, the omnidirectional contrast obtained by optical simulation with a 4×4 matrix is shown in Table 1 and the contrast contour map is shown in FIG. 9.

Example 4

A multilayer body 2 having a thickness of 176 μm was prepared exactly in the same manner as Preparative Example 1 except that the thickness of the styrene-maleic anhydride copolymer resin layer (the layer "b") was adjusted to 160 μm (the step of forming the multilayer body).

The multilayer body 2 was supplied to the tenter crosswise uniaxial stretching machine and then stretched in the crosswise direction at a stretching temperature of 150° C. at a stretching ratio of 2.7 (the first stretching step). Subsequently, the stretched film was supplied to the lengthwise uniaxial stretching machine and then stretched in the lengthwise direction at a stretching temperature of 128° C. at a stretching ratio of 1.25 to obtain a phase difference plate 5 (the second stretching step).

Figure 10:
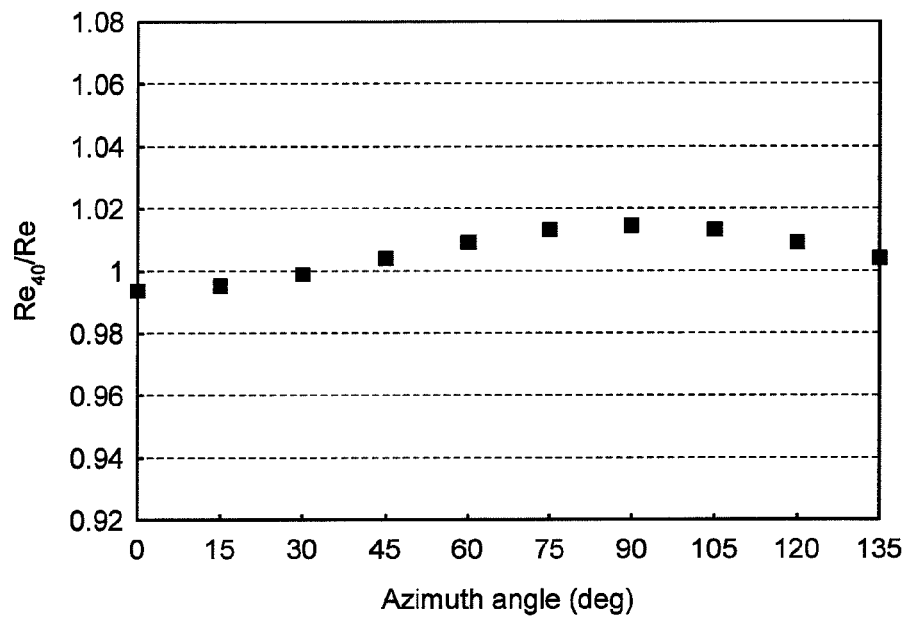
FIG. 10 is a graph of a ratio $R_{40}/Re$ of a phase difference plate 5 manufactured in Example 4 of the present invention plotted in increments of an azimuth angle of 15 degrees, wherein Re is a retardation at an incident angle of 0 degree, and $R_{40}$ is a retardation at an incident angle of 40 degrees.

With regard to the resulting phase difference plate 5, the in-plane retardation Rea and the thickness direction retardation Rta of the layer "a" as well as the in-plane retardation Reb and the thickness direction retardation Rtb of the layer "b" were measured. The results are shown in Table 1. The resulting phase difference plate 5 satisfied the relationship of $n_x > n_z > n_y$. Furthermore, the multilayer body 2 used for manufacturing the phase difference plate 5 satisfied the requirement P. Furthermore, the ratio $R_{40}/Re$ between the retardation Re at an incident angle of 0 degree and the retardation $R_{40}$ at an incident angle of 40 degrees of the resulting phase difference plate 5 was plotted in increments of an azimuth angle of 15 degrees. The results are shown in FIG. 10.

Figure 11:
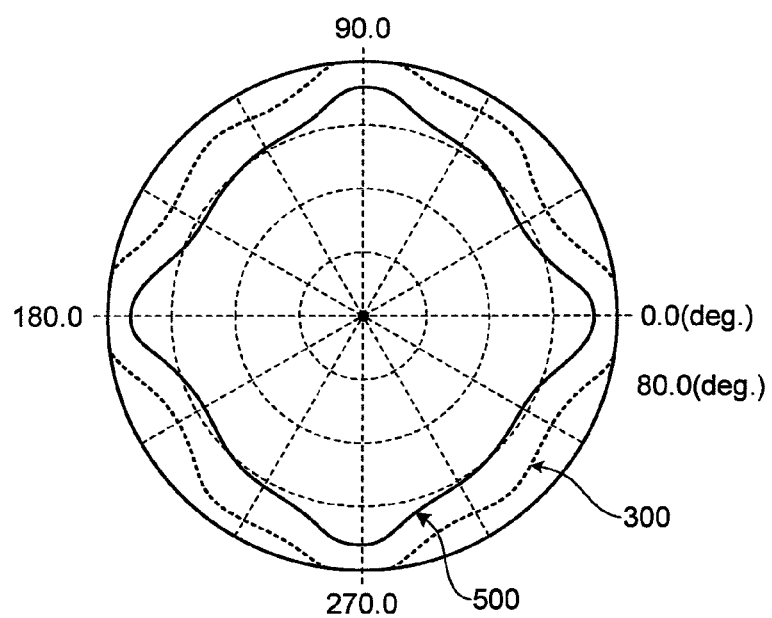
FIG. 11 is a graph illustrating the contrast contour map measured in Example 4 of the present invention.

Furthermore, the display properties of the resulting phase difference plate 5 were visually evaluated in the aforementioned manner. As a result, the display was good and uniform when the screen was viewed from the front direction, and also when the screen was viewed from directions tilted to all directions within a polar angle of 80 degrees. With regard to this liquid crystal display device, the omnidirectional contrast obtained by optical simulation with a 4×4 matrix is shown in Table 1 and the contrast contour map is shown in FIG. 11.

Example 5

A multilayer body 3 having a thickness of 200 μm was prepared exactly in the same manner as Preparative Example 1 except that the thickness of the polycarbonate resin layer (the layer "a") was adjusted to 20 μm (the step of forming the multilayer body).

The multilayer body 3 was supplied to the tenter crosswise uniaxial stretching machine and then stretched in the crosswise direction at a stretching temperature of 150° C. at a stretching ratio of 2.7 (the first stretching step). Subsequently, the stretched film was supplied to the lengthwise uniaxial stretching machine and then stretched in the lengthwise direction at a stretching temperature of 128° C. at a stretching ratio of 1.25 to obtain a phase difference plate 6 (the second stretching step).

Figure 12:
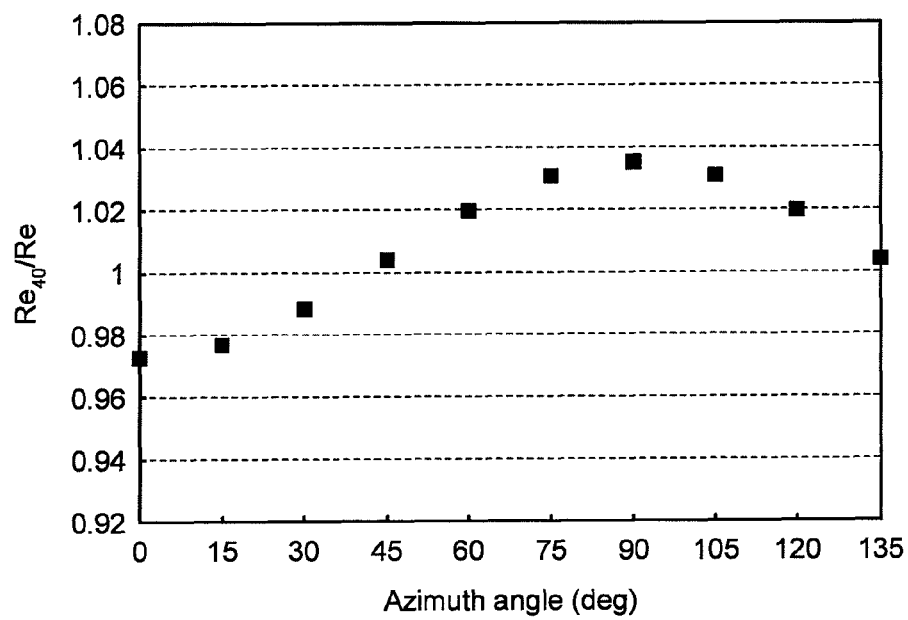
FIG. 12 is a graph of a ratio $R_{40}/Re$ of a phase difference plate 5 manufactured in Example 5 of the present invention plotted in increments of an azimuth angle of 15 degrees, wherein Re is a retardation at an incident angle of 0 degree, and $R_{40}$ is a retardation at an incident angle of 40 degrees.

With regard to the resulting phase difference plate 6, the in-plane retardation Rea and the thickness direction retardation Rta of the layer "a" as well as the in-plane retardation Reb and the thickness direction retardation Rtb of the layer "b" were measured. The results are shown in Table 1. The resulting phase difference plate 6 satisfied the relationship of $n_x > n_z > n_y$. Furthermore, the multilayer body 3 used for manufacturing the phase difference plate 6 satisfied the requirement P. Furthermore, the ratio $R_{40}/Re$ between the retardation Re at an incident angle of 0 degree and the retardation $R_{40}$ at an incident angle of 40 degrees of the resulting phase difference plate 6 was plotted in increments of an azimuth angle of 15 degrees. The results are shown in FIG. 12.

Figure 13:
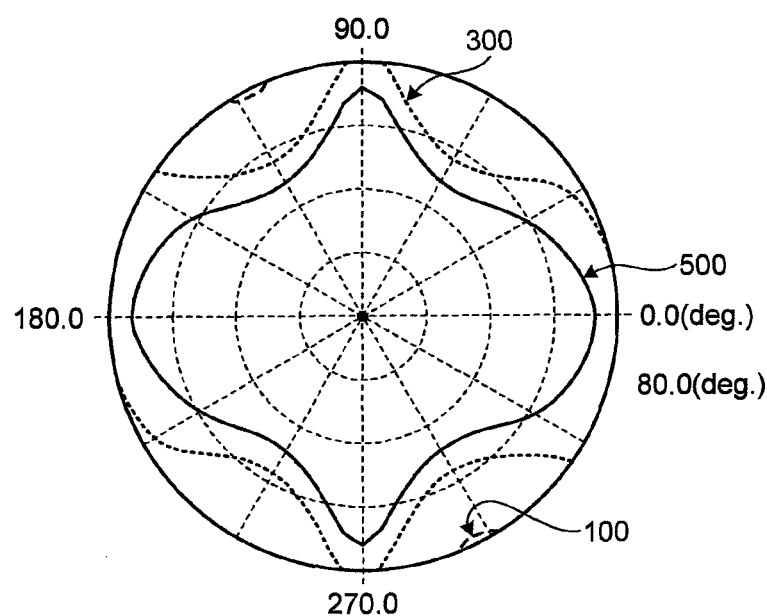
FIG. 13 is a graph illustrating the contrast contour map measured in Example 5 of the present invention.

Furthermore, the display properties of the resulting phase difference plate 6 were visually evaluated in the aforementioned manner. As a result, the display was good and uniform when the screen was viewed from the front direction, and also when the screen was viewed from directions tilted to all directions within a polar angle of 80 degrees. With regard to this liquid crystal display device, the omnidirectional contrast obtained by optical simulation with a 4×4 matrix is shown in Table 1 and the contrast contour map is shown in FIG. 13.

TABLE 1

Measurement results

| | Layer "a" | | Layer "b" | | |
|---|---|---|---|---|---|
| | Rea (nm) | Rta (nm) | Reb (nm) | Rtb (nm) | Omnidirectional contrast |
| Example 1 | 21 | 83 | 132 | −67 | >180 |
| Example 2 | 22 | 85 | 141 | −88 | >80 |
| Example 3 | 9 | 75 | 139 | 86 | >65 |
| Example 4 | 22 | 84 | 121 | −75 | >180 |
| Example 5 | 31 | 95 | 131 | −66 | >90 |
| Comparative Example 1 | 51 | 67 | 10 | −12 | >5 |

Summary

As can be seen from Table 1, performing the step of forming the multilayer body, the first stretching step, and the second stretching step makes it possible to manufacture the phase difference plate wherein the in-plane retardation Rea and the thickness direction retardation Rta of the layer "a" as well as the in-plane retardation Reb and the thickness direction retardation Rtb of the layer "b" satisfy Equations 1 to 4. It is also seen that, in Examples 1 to 5 wherein the in-plane retardation Rea and the thickness direction retardation Rta of the layer "a" and the in-plane retardation Reb and the thickness direction retardation Rtb of the layer "b" satisfy Equations 1 to 4, a high omnidirectional contrast is realized and thereby a sufficient polarizing plate compensation function is exerted.

INDUSTRIAL APPLICABILITY

The phase difference plate and the method for manufacturing the phase difference plate of the present invention is applicable to any optical applications and in particular, suited for use with liquid crystal display devices.

The invention claimed is:

1. A method for manufacturing a phase difference plate, comprising:
   a step of co-extruding or co-casting a resin A having a positive intrinsic birefringence value and a resin B having a negative intrinsic birefringence value, to form a multilayer body including a layer "a" containing the resin A and a layer "b" containing the resin B;
   a first stretching step of stretching the multilayer body at a temperature T1 in one direction; and
   a second stretching step of stretching, after the first stretching step, the multilayer body at a temperature T2 that is lower than the temperature T1 in another direction that is approximately orthogonal to the aforementioned stretching direction to obtain the phase difference plate, wherein:
   the phase difference plate satisfies Equation 1 to Equation 4:

$$0 \text{ nm} < Rea < 50 \text{ nm} \quad \text{Equation 1}$$

$$50 \text{ nm} < Rta < 100 \text{ nm} \quad \text{Equation 2}$$

$$100 \text{ nm} < Reb < 150 \text{ nm} \quad \text{Equation 3}$$

$$100 \text{ nm} < Rtb < -40 \text{ nm} \quad \text{Equation 4}$$

wherein Rea is an in-plane retardation of the stretched layer "a", Rta is a retardation in a thickness direction of the stretched layer "a", Reb is an in-plane retardation of the stretched layer "b", and Rtb is a retardation in a thickness direction of the stretched layer "b".

2. The method for manufacturing a phase difference plate according to claim 1, wherein a glass transition temperature $Tg_A$ of the resin A and a glass transition temperature $Tg_B$ of the resin B satisfy a relationship of $Tg_A > Tg_B + 5°$ C.

3. The method for manufacturing a phase difference plate according to claim 1, wherein the temperature T1 is higher than $Tg_B$.

4. The method for manufacturing a phase difference plate according to claim 1, wherein the temperature T2 is higher than $Tg_B - 20°$ C.

5. The method for manufacturing a phase difference plate according to claim 1, wherein the stretching in the first stretching step and the stretching in the second stretching step are uniaxial stretching, and the uniaxial stretching in the second stretching step is performed at a stretching ratio less than the ratio at which the uniaxial stretching in the first stretching step is performed.

6. The method for manufacturing a phase difference plate according to claim 1, wherein the multilayer body satisfies the requirement that the phase of linearly polarized light which is incident perpendicular to the plane of film and has the oscillation plane of the electric vector in the XZ-plane relative to the phase of the linearly polarized light which is incident perpendicular to the plane of film and has the oscillation plane of the electric vector in the YZ-plane:
   retards when the multilayer body is uniaxially stretched in the X-axis direction at one of the temperatures T1 and T2, and
   advances when the multilayer body is uniaxially stretched in the X-axis direction at the other of the temperatures T1 and T2,
   where the x-axis is a stretching direction for a certain direction, the Y-axis is a direction orthogonal to the uniaxial stretching direction within the plane of film, and the Z-axis is the thickness direction of the film.

* * * * *